United States Patent [19]
Sid-Ahmed

[11] Patent Number: 5,621,470
[45] Date of Patent: Apr. 15, 1997

[54] INTERPIXEL AND INTERFRAME INTERPOLATION OF TELEVISION PICTURES WITH CONVERSION FROM INTERLACED TO PROGRESSIVE SCANNING

[76] Inventor: Maher A. Sid-Ahmed, 12703 Riverside Dr., E., Tecumseh, Ontario, Canada

[21] Appl. No.: 499,631

[22] Filed: Jul. 7, 1995

Related U.S. Application Data

[63] Continuation-in-part of Ser. No. 992,798, Dec. 8, 1992, abandoned.

[51] Int. Cl.⁶ .................................. H04N 7/01; H04N 7/00
[52] U.S. Cl. ........................ 348/448; 348/458; 348/555
[58] Field of Search ............................. 348/555, 556, 348/443, 447, 448, 458; H04N 7/01, 7/00

[56] References Cited

U.S. PATENT DOCUMENTS

| | | | |
|---|---|---|---|
| 4,282,546 | 8/1981 | Reitmeier | 358/22 |
| 4,322,750 | 3/1982 | Lord | 358/140 |
| 4,364,090 | 12/1982 | Wendland | 358/140 |
| 4,435,728 | 3/1984 | Raven | 358/140 |
| 4,603,351 | 7/1986 | Vreeswijk et al. | 358/140 |
| 4,706,113 | 11/1987 | Ito et al. | 358/37 |
| 4,868,656 | 9/1989 | Geiger et al. | 358/140 |

*Primary Examiner*—Glenton B. Burgess
*Attorney, Agent, or Firm*—Gifford, Krass, Groh, Sprinkle, Patmore, Anderson & Citkowski

[57] ABSTRACT

Methods and apparatus for enhancing the definition of television images in real-time is presented. Television video signals are digitized and processed, preferably through 3-D filtering, to increase the number of pixels per line, horizontal lines per frame, and frames per second and provide an output in progressive-scan format. The system accepts an interlaced scanned image of any transmission standard (NTSC, PAL, etc.), and can be adapted to work on progressively scanned images or digitally stored/transmitted images in real-time or off-line.

15 Claims, 6 Drawing Sheets

INTERPIXEL AND INTERFRAME INTERPOLATION OF TELEVISION PICTURES WITH CONVERSION FROM INTERLACED TO PROGRESSIVE SCANNING

REFERENCE TO RELATED APPLICATIONS

This is a continuation-in-part application of U.S. Ser. No. 07/992,798, filed Dec. 18, 1992 now abandoned.

FIELD OF THE INVENTION

The present invention is concerned with television, and, more particularly, with processes and hardware implementations associated with providing an improved definition image while complying with current broadcast standards.

BACKGROUND OF THE INVENTION

Advanced signal processing techniques are now being employed in the development of new television receivers. Such developments, termed ATV or advanced television techniques, include the concept of improved definition television, or IDTV, wherein the definition of the displayed image is enhanced by increasing the number of displayed lines over those present in the transmitted video signal. IDTV techniques become especially prominent in large screen sets where horizontal TV lines are discernable at normal viewing distances with present standards.

High definition television techniques, on the other hand, involve methods that require changes in the transmitted signal, such as doubling the number of transmitted lines, and a complete redesign of the receiver. As such, HDTV standards impose an increase in the bandwidth of each channel beyond the limit set by the FCC (6 Mhz for the US NTSC standard). The stringent requirement by the FCC to remain within the bounds of the specified channel Bandwidth has caused delays and partial solutions to the evolution of a world HDTV standard. One of the recommendations for HDTV requested by many European countries, for example, is to move away from interlaced scanning to progressive scanning. Since IDTV works with the existing standards to provide an enhanced definition image, it represents an interim solution until an HDTV standard is agreed upon, and may also be used with HDTV to further enhance large displays. Even in the case of IDTV, however, very large intermediate storage arrays and very high-speed processing may be required to achieve the requisite level of signal processing, particularly if the goal is a system that operates in real time. An outstanding need, therefore, is a method and specialized hardware for achieving the requirements of IDTV.

SUMMARY OF THE INVENTION

The present invention provides methods and apparatus for increasing the number of pixels per horizontal line, increasing the number of horizontal lines, and doubling the number of frames per second at the receiver without requiring changes to the transmission standard. The enhanced images are preferably presented at a rate of 60 frames/second, and in a form suitable for progressive scanning.

According to the method aspect of the invention, a raster scanned image is digitized and stored in a frame store. The picture elements (pixels) saved in the frame store are read-out at 8 times the horizontal sampling frequency and transmitted to an interpolator, preferably realized as a 3-D filter, to produce twice the number pixels along each horizontal line, twice the number of lines in each frame and double the number of frames/second. Two frame stores are used to support real-time processing of the interlaced TV video signal.

BRIEF DESCRIPTION OF THE DRAWINGS

FIG. 6 illustrates the design of a frame delay for use in the design of 3-D filters.

PREFERRED EMBODIMENT OF THE PRESENT INVENTION

It is possible with advanced digital signal processing (DSP) techniques to increase the number of lines and the frame rate of an incoming video signal. Since TV images can be perceived as a sequence of two-dimensional signals, which is in actuality a three dimensional signal with two spatial dimensions in each image plane and a time dimension across the sequence of frames, three-dimensional (3-D) filters are well suited to this application.

Since in an IDTV application it is required to double the size of the image along both the vertical and horizontal dimensions (quadruple the number of pixels) and double the number of frames per second to allow for progressive scanning, such a 3-D filter should have a throughput frequency of 8 times the sampling frequency along each horizontal line. This sets the throughput rate of such a filter for the US NTSC standard to 88.2 Mhz. Thus, for the US NTSC standard, the 3-D filter should process 88.2 million pixels per second, and if, say, 20 multiply/add operations are performed on each pixel, the filter should perform 1.764 Giga multiply/add per second. This extremely large number of operations per second would benefit from a special purpose hardware design for the 3-D filter structure, a pipelined implementation being a preferred choice. This invention presents a semi-systolic realization (a form of pipeline design) for the 3-D filter, and a method of utilizing such a structure for achieving the requirements of IDTV.

Figure 1:
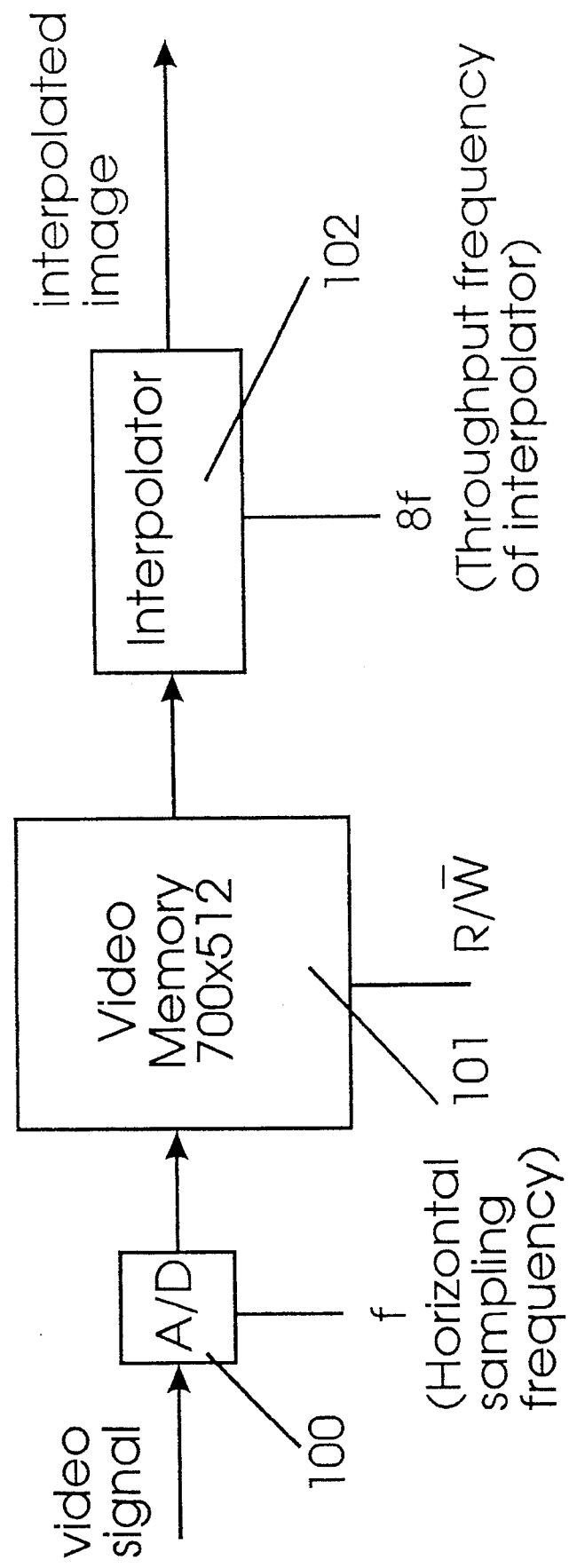
FIG. 1 is an illustration of a general concept used in the development of IDTV.

The general concept used is depicted in FIG. 1. A television (TV) video signal is digitized using an A/D converter, 100, (if not already in digital form), from a complete frame of a television image say, 700×512 pixels, and written in a two-dimensional memory array, 102. Note that in the US NTSC system there are 700 pixels horizontally by 525 lines or 4:3 aspect ratio, of which about 485 lines can be captured on the screen, with the rest lost during retrace, and therefore digitization at 512 lines i.e., 9 bit for vertical addressing, is usually employed, thus capturing the 485 lines with the last few remaining lines usually replaced with 0's.

In the US NTSC system 30 frames per second are transmitted to the receiver. Each frame is transmitted as two fields, and each field is transmitted at the rate of 60 per second. Since the effect of image flicker is unnoticeable if 60 images/second are seen by the human eye, it becomes necessary that the reading of the 2-D array would be at the rate of 60 frames per second. If f is the sampling frequency of the incoming video signal, then $$\text{write time} = \frac{1}{f} \times 700 \times 525$$

$$= \frac{1}{60} + \frac{1}{60} = \frac{1}{30} \text{ seconds}$$

where f=700/H and 1/H=line scanning frequency, which is 15,750 Hz in the US NTSC system, H is the horizontal line delay, and the number of lines is 525 lines of which about 485 are available, the rest are lost during the retrace period between consecutive fields.

If each pixel is read twice and each horizontal line is read twice and the whole frame is read at twice the frame rate at which the image was written, then:

$$\text{read time} = \frac{1}{f_1} \times 1400 \times 1050$$

$$= \frac{1}{60} \text{ seconds}$$

where $f_1$ is the frequency by which pixels are read-out of memory. Since the read-time for a complete image is set to 1/60 second, and the image is kept in memory for 1/30th of a second, the image will be read twice. The throughput rate of the interpolator, 102, is set by frequency $f_1$ which is given by:

$$\frac{4}{f_1} \times 700 \times 525 = \frac{1}{2} \times \frac{1}{f} \times 700 \times 525$$

or $$f_1 = 8f$$

Thus for the image to be displayed at the rate of 60 frames per second, the interpolator should have a throughput frequency of 8 times the sampling frequency. At that throughput frequency the same image is read-out of the memory array twice every 1/60 second. If a 2-D digital interpolator is used then interpixel interpolation is carried-out as well as frame replication. The images from the interpolator are available at 60 frames per second which are in a form ready for display in a progressive scanning format.

Figure 2:
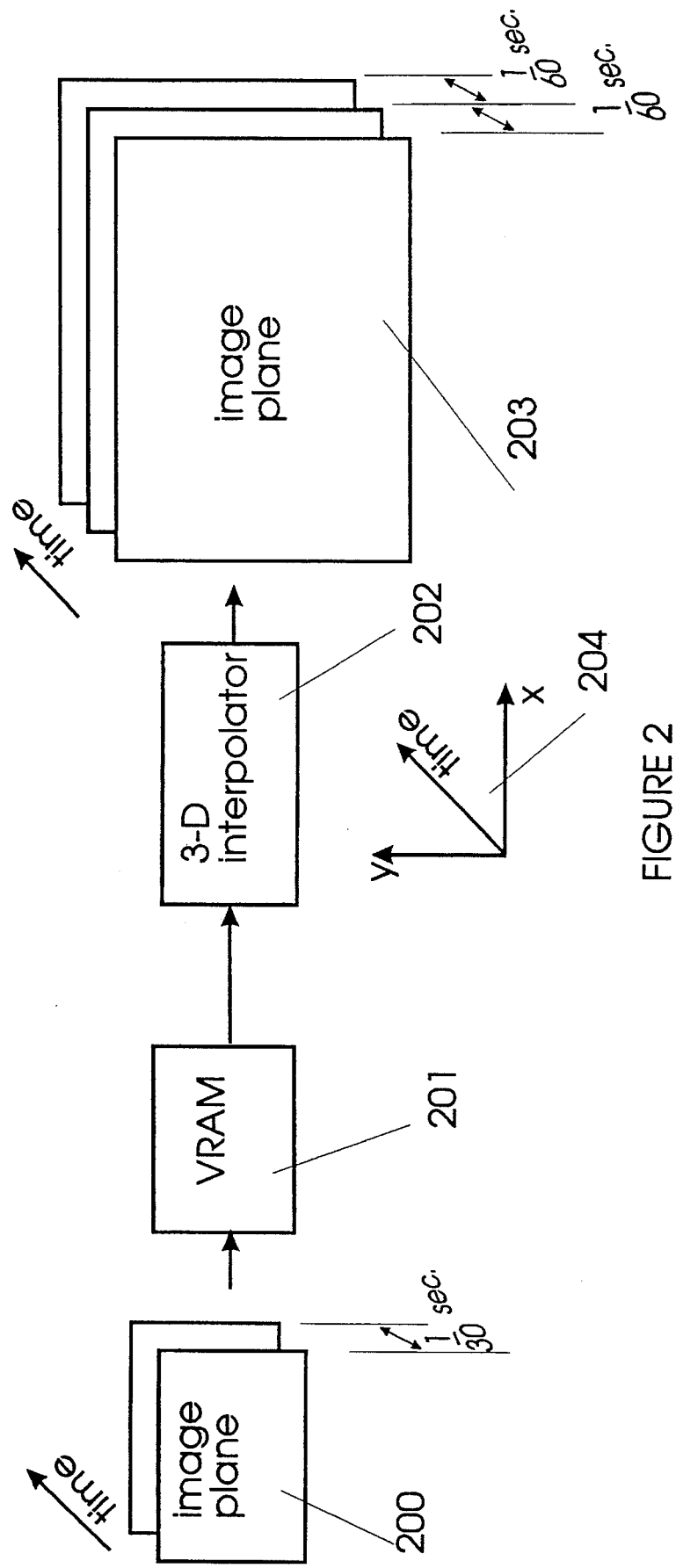
FIG. 2 illustrates the concept of three-dimensional interpolation.

The process of interpixel interpolation and frame replication can be viewed as a three-dimensional, 3-D, operation (see FIG. 2). FIG. 2 depicts the 3-D effect of the interpolator block when running at a throughput frequency of 8 times the sampling frequency. In FIG. 2 a complete frame of a TV image, 200, stored in video read-write memory (VRAM), 201, is presented to the 3-D interpolator, 202, every 1/60 th second with each image being read twice. The 3-D interpolator receives each pixel twice from the VRAM store and each line twice and interpolates the pixels in the x-y planes and along the time axis to provide improved definition (expanded) TV images of complete frames at the rate of 60 frames a second.

Figure 3:
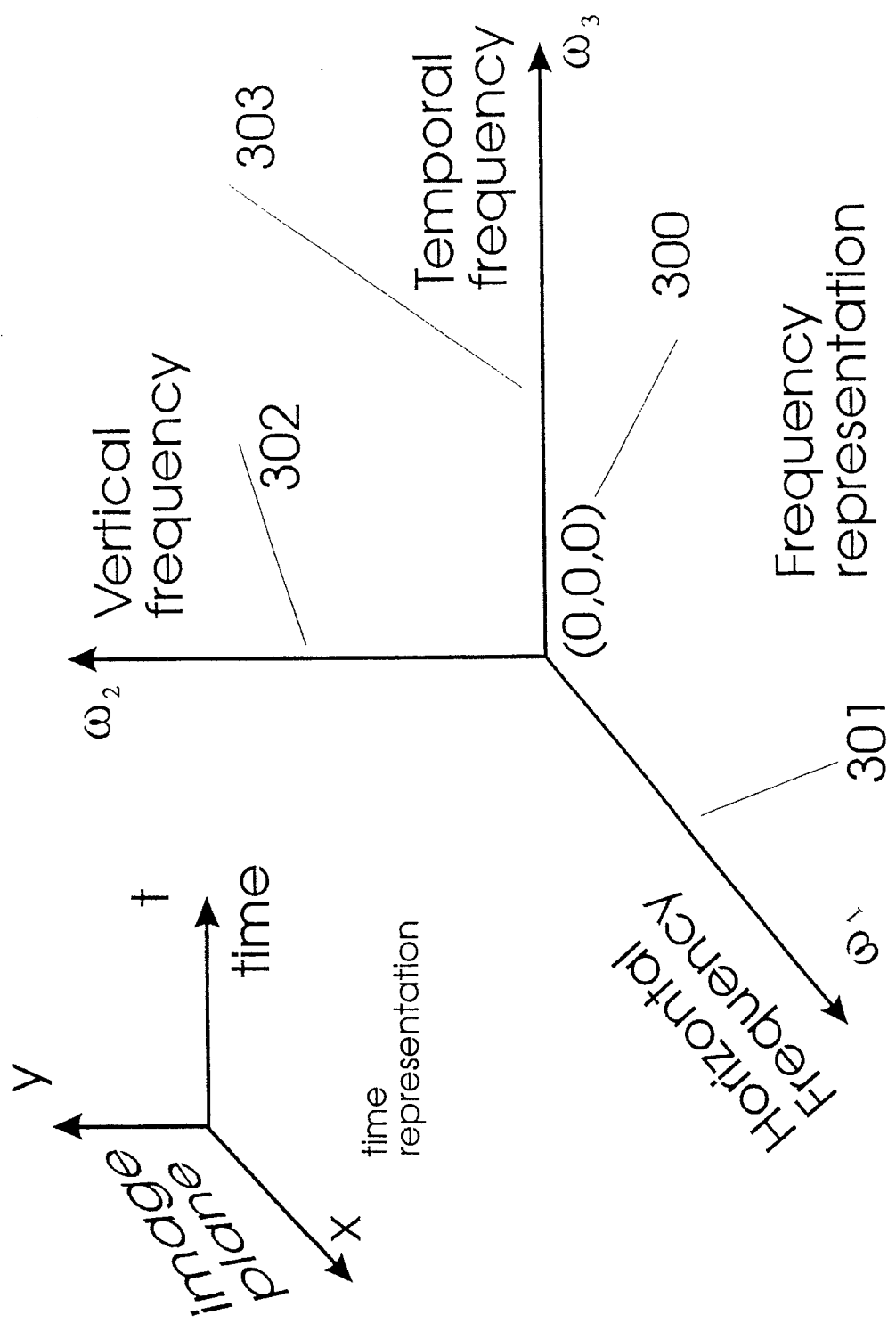
FIG. 3 illustrates three dimensions associated with television video signals.

Making use of the Sampling theorem and the fact that video signals of "moving" images tend to, in general, decay rapidly in the 3-D frequency domain from the (0,0,0) frequency point, 300, (see FIG. 3), an "optimum" 3-D interpolator may be derived, which turns out to be a 3-D low-pass filter with cubical-symmetry and sharp cut-off having horizontal 301, vertical 302, and temporal 303, cut-off frequencies of:

$$f \times \frac{\pi}{2}, \frac{\pi}{2 \times H}, \text{ and } 30 \times \frac{\pi}{2} \text{ respectively.}$$

Such a filter should realize the implied process of pixel, line and frame replications as was described for the operation of the diagram shown in FIG. 2.

The filter carries out the interpolation of the expanded and replicated images, and consequently yielding images with double the number of pixels along each horizontal line, double the number of lines and double the number of frames per second. Since the entire interpolation process (pixels, lines and frames) are derived from principles obtained from the Sampling theorem, the resultant expanded images should be optimum in quality relative to the received images. Note that the process can be easily modified to quadruple or more the size of the images and if required even quadruple or more the number of frames. It should also be noted that cubical symmetry for the 3-D filter interpolator is not a must and other type of symmetries, such as spherical symmetry, can be used.

By using 3-D filters, interpixel as well as interframe interpolations may be performed to provide a flicker free image display with four times the number of pixels per frame. The 60 frames per second are spatially interpolated frames. In the case of using 2-D interpolators in the design as described for the diagram of FIG. 1, the 60 frames per second are produced from the 30 frames per second through frame replication.

A 3-D infinite-impulse response (IIR) filter transfer function is given by:

$$H(z_1, z_2, z_3) = \frac{\sum_{i=0}^{N} \sum_{j=0}^{N} \sum_{k=0}^{N} a_{ijk} z_1^{-i} z_2^{-j} z_3^{-k}}{\sum_{i=0}^{N} \sum_{j=0}^{N} \sum_{k=0}^{N} b_{ijk} z_1^{-i} z_2^{-j} z_3^{-k}}$$

where $b_{000}=1$ and $z_1^{-1}$, $z_2^{-1}$, $z_3^{-1}$ represent a pixel, a line, and a frame delay, respectively. N is the order of the filter. Following interpolation, a high-pass filter may be employed to sharpen the interpolated image, though a 2-D type filter may be all that is required.

Figure 4:
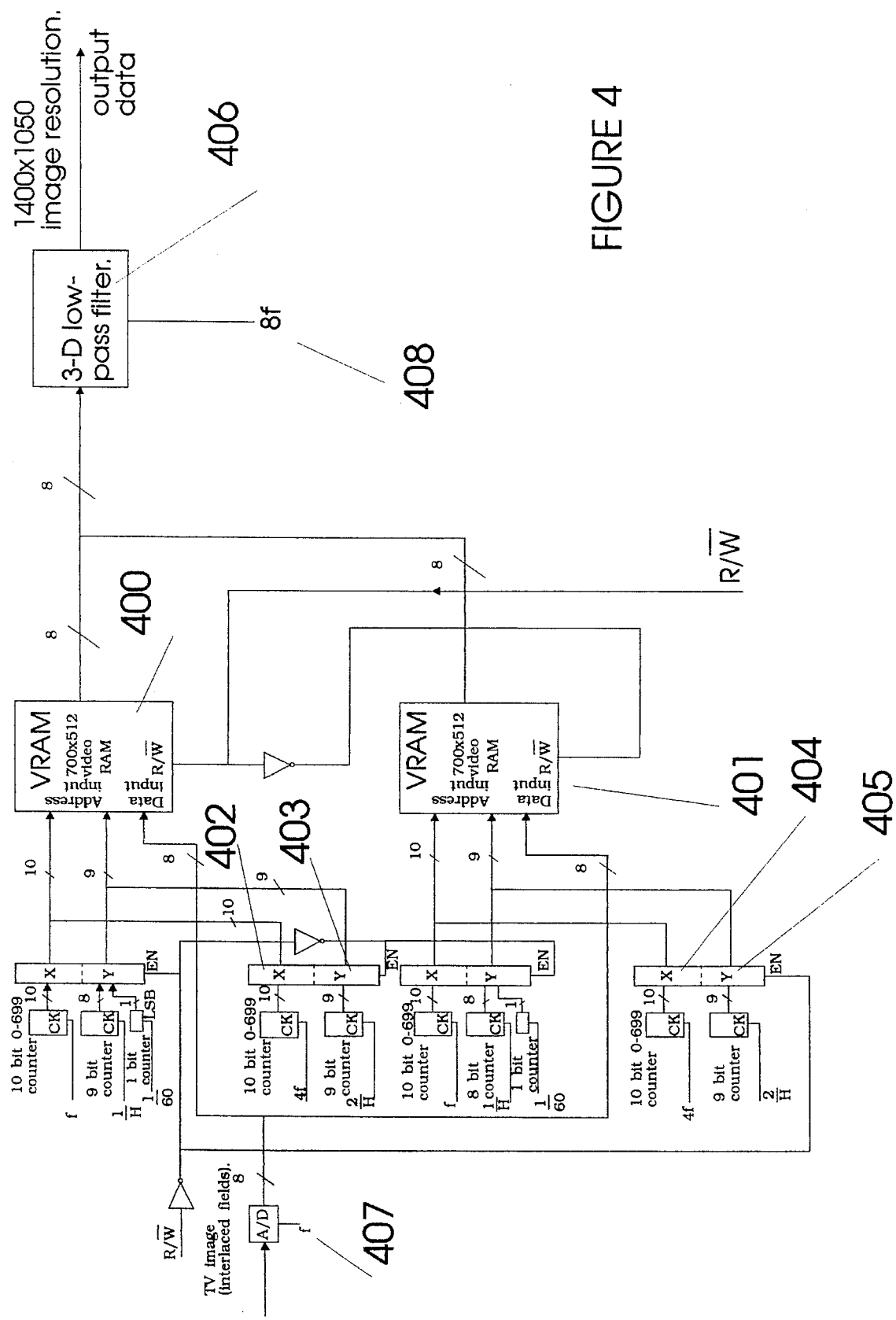
FIG. 4 shows an IDTV add-on circuit diagram for use with television receiver circuits to provide enhanced definition with progressive scanning at 60 frames/second.

FIG. 4 depicts an arrangement for real-time processing of television images for the purpose of interpixel and interframe interpolation. The arrangement works as follows. Two video memory arrays (VRAM's) are used, 400 and 401, to allow real-time operation of television images. While one memory is in read-mode, the other is in write mode and the two alternate between read/write modes with every incoming frame. The memory array placed in write mode allows pixels from the first field to be written at consecutive locations of even rows (rows 0, 2, 4 . . . , 510), and the second field at consecutive locations of odd rows (1, 3, 5 . . . ,511). Each field is written to the memory array in 1/60 of a second and thus a complete frame is written in 1/60+1/60=1/30 a second. While one memory array receives the incoming frame, the previous frame is read from the other memory array.

Since the 3-D filter has to operate at 8 times the horizontal sampling frequency, f, and since each pixel along each row should be read twice (to simulate pixel replication), the address counter for the X-address register, 402 or 404, in the write mode memory array should be operated at a frequency of 4f. In order to read each row twice (to simulate line replication), The Y address counter, 403 or 405, should operate at a frequency of 4f/1050. That is:

$$f_x = 4f$$

$$f_y = \frac{4f}{1050} = 2\left(\frac{f}{525}\right) = \frac{2}{H}$$

$$\text{write-time} = H \times 525 = \frac{1}{30}$$

and $$\text{read-time} = \left(\frac{H}{2}\right) \times 525$$

$$\therefore \text{read-time} = \frac{1}{60} \text{ sec.}$$

Since each image is available for 1/30 of a second, each image is read twice, and hence such a process would be equivalent to frame replication. Since replication is followed by a 3-D low-pass filter, frame interpolation is consequently accomplished.

In the US NTSC system, assuming each frame is digitized to 700×512 pixels, then the sampling frequency is given by:

$$f = 30 \times 700 \times 525$$

and hence the 3-D filter should have a throughput frequency of:

$$8f = 88.2 \text{ MHz}$$

3-D digital filters can be either of the finite impulse response type (FIR) or infinite-impulse response (IIR) type. An IIR type filter realization will be presented for this embodiment, and for the case N=2 (second order). Note also that finite-impulse response, FIR, type filters can also be used, however, much higher orders will be needed than would be required for IIR types for a similar frequency response, and hence the cost of realization for an FIR filter will be much higher than for an IIR type.

Figure 5A:
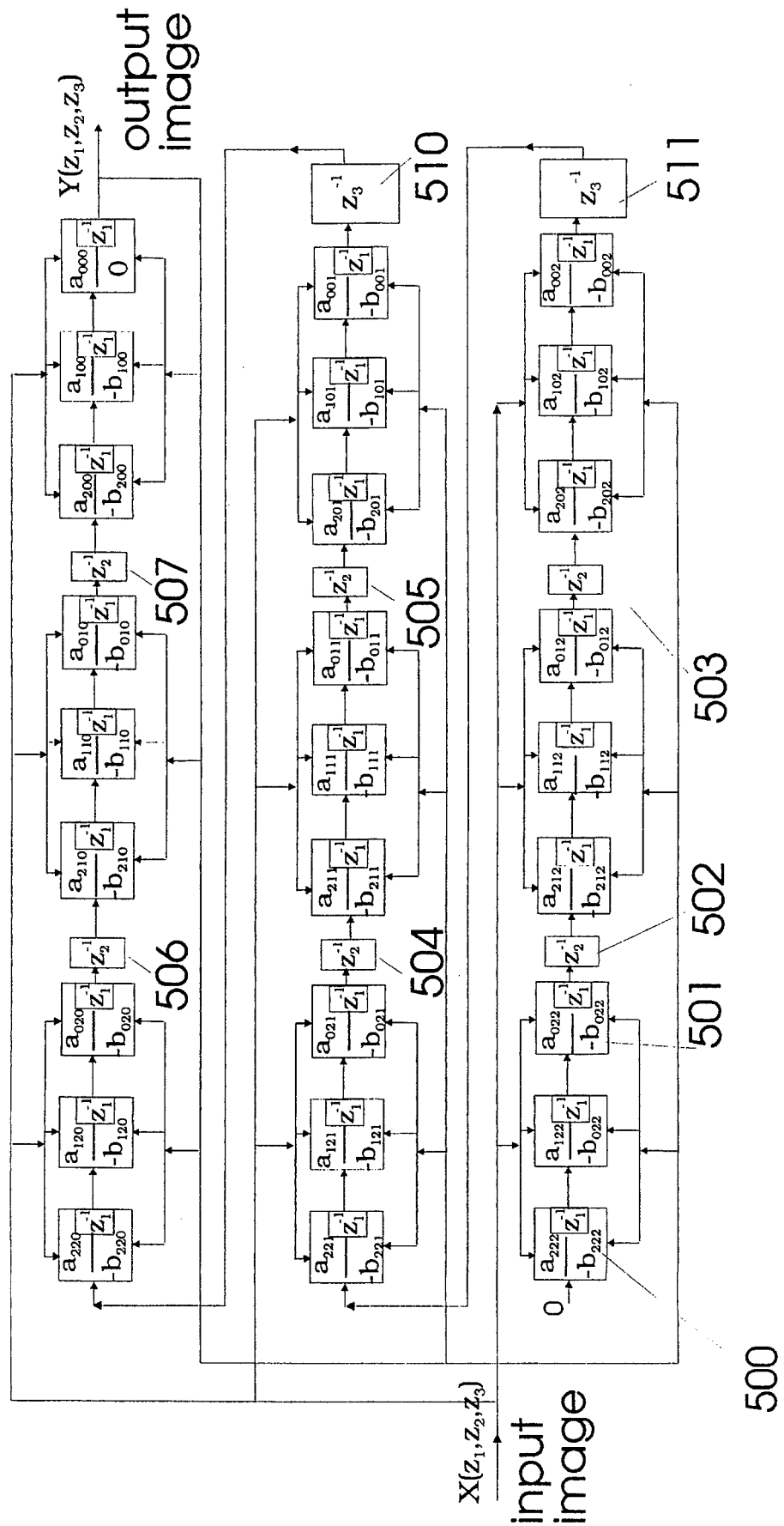
FIG. 5 illustrates a systolic realization of a 3-D infinite impulse response filter of order 2.
Figure 5:
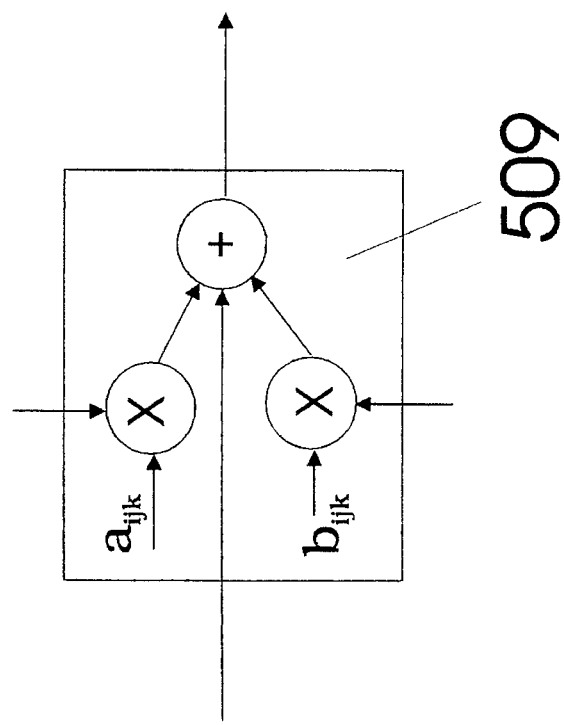
Figure 5:
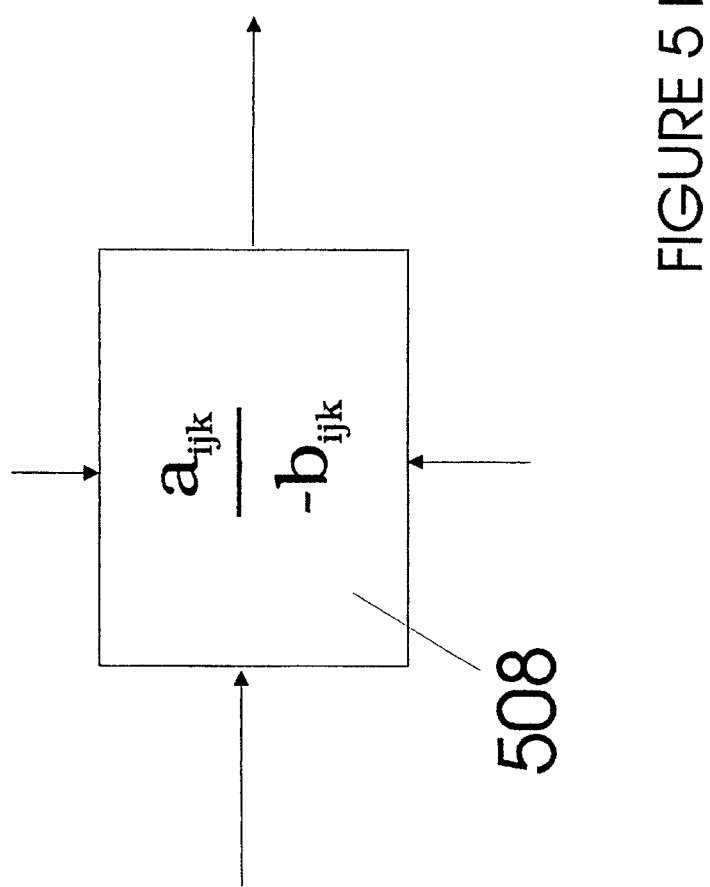

A semi-systolic hardware realization is shown in FIG. 5, which consists of 2 types of processing elements (PE's), 500 and 501. Type 501 is described by the blocks of FIG. 5B, 508 and 509, and consists of 2 multipliers and one-adder. Type 500 has a similar structure as type 501 except it includes a pixel delay at the output stage. Since the structure is semi-systolic, its throughput rate is governed by the delay of one PE or the delay of one multiply/add. For the US NTSC the PE should have a minimum throughput of 88.2 Mhz. The filter structure also consists of 6 line delays 502, 503, . . . ,507 and two frame delays 510 and 511. Pixel and line delays commercially available are capable of shift frequencies in excess of 100 Mhz.

Both digital and analog implementations of 3-D filters are possible. In digital implementations line delays are basically long shift registers of type FIFO having width of 9 bits or more can be used. In analog implementation charge coupled devices, CCD's, can be used as analog line delays. Frame delays, if not available commercially can be constructed from VRAM's as shown in FIG. 6.

The frame delay shown in FIG. 6 is realized from fast RAM 600, for a frame size of 700×512 pixels. The set-up basically works as a FIFO shift register, and operates as follows. The clock signal, 601, driving the R/W memory and counter, 602, sets the R/W memory to the read mode during the period when the clock signal is high, and to write mode during the period when the clock signal is low. Before the circuit is switched on, the 19 bit (modulus 358400) counter is set to 700×512−1=358399. At the first clock cycle and during the read portion, the output read is that of location zero of the R/W memory, which should contain a zero value at the start. During the write portion of the cycle, data is written at that same location. In the second clock cycle, the counter is incremented to 1, reading of the second location first takes place in memory during the period when the clock signal is high, which is again zero, and writing is carried-out, during the second half of the cycle, at the same location of the R/W memory. This continues until the counter is at 358399. The following cycle resets the counter to zero, the value that was written at location zero in the first cycle is read-out, and a new value written in, and so on.

It should be apparent that the arrangement of FIG. 6 works as a FIFO shift register for a complete frame, and hence is a design of a frame delay.

Many adaptations of the above design for IDTV are possible, including:

1. Over sampling each horizontal line to 1400 pixels (in the US NTSC standard) and using a 2-D type filter for line and frame interpolation;

2. Over sampling each horizontal line to 1400 pixels (in the US NTSC standard) and using a 1-D type filter for line interpolation and applying frame replication for obtaining 60 frames/sec.

3. Running the interpolator at a throughput frequency of 4 times the horizontal sampling frequency, and when using frame stores for frame replication.

The foregoing descriptions of the preferred embodiments of the present invention have been presented for the purpose of illustration and description. They are not intended to be exhaustive or to limit the invention to the precise form disclosed. Many modifications are possible in light of the above teachings. Moreover, it should in no way be construed that the present invention is limited to those applications which involve raster scanned images in the context of a particular standard, which is either existing or envisioned (i.e. NTSC, PAL, SECAM, etc.).

What is claimed is:

1. A system for expanding the number of pixels and frames of a television video signal to provide an improved definition image in a progressive scan format, comprising:

means for receiving pixels associated with an incoming frame of a digitized television image having a plurality of horizontal lines;

means for digitally interpolating the pixels along each horizontal line, between horizontal lines and between consecutive frames, including:

two read/write memory arrays in communication with a common output data bus, the arrays being configured to receive data representative of interlaced fields, each memory array alternating between read mode and write modes with each incoming new frame, means for writing two consecutive fields of each frame into either of the two memory arrays, and means for alternately addressing the two memory arrays to allow multiple reading of each pixel along each horizontal line, multiple reading of each horizontal line, and multiple reading of each frame, means for converting the digitally interpolated pixels into a progressive, raster-scanned format; and means for displaying the converted pixels.

2. A system for expanding the number of pixels and frames of a television video signal to provide an improved definition image in a progressive scan format, comprising:

means for receiving pixels associated with an incoming frame of a digitized television image having a plurality of horizontal lines;

means for digitally interpolating the pixels along each horizontal line, between horizontal lines and between consecutive frames, including a three-dimensional low-pass filter operating at a throughput rate sufficient to allow multiple reading of each pixel along each horizontal line, multiple reading of each horizontal line, and multiple reading of the consecutive video frames;

means for converting the digitally interpolated pixels into a progressive, raster-scanned format; and means for displaying the converted pixels.

3. The system of claim 2, wherein the three-dimensional low low-pass filter having cubic symmetry in the three-dimensional frequency space.

4. The system of claim 2, wherein the the three-dimensional low-pass filter is an infinite impulse response filter realized as a semi-systolic structure, comprising processing elements and line delays, having a throughput rate governed by a delay of the slowest processing element.

5. The system of claim 2, wherein the three-dimensional low pass-filter is a finite impulse response filter realized as a systolic structure.

6. The system of claim 2, wherein the system for expanding the number of pixels and frames of a television video signal to provide an improved definition image in a progressive scan format, further comprising:

two read/write memory arrays configured to receive data representative of interlaced fields, wherein each memory array alternates between read mode and write mode with each incoming new frame, and both memory arrays are in communication with a common output data bus;

means for writing two consecutive fields of each frame into either of the two memory arrays: and means for reading alternately the two memory arrays to allow multiple read of each pixel along each horizontal line, multiple read of each horizontal line and multiple read of each frame of a television image.

7. The system of claim 2, wherein the progressive scanned image is converted to an interlaced scanned format.

8. A system for expanding the number of pixels and frames of a television video signal to provide an improved definition image in a progressive scan format, comprising:

means for receiving pixels associated with an incoming frame of a digitized television image having a plurality of horizontal lines;

means for digitally interpolating the pixels along each horizontal line, between horizontal lines and between consecutive frames, including means for over-sampling each horizontal line, and means for interpolating between consecutive lines and between consecutive frames through two-dimensional filtering, including a 2-D filter with square symmetry in two-dimensional space;

means for converting the digitally interpolated image into a progressive, raster-scanned format; and means for displaying the converted pixels and frames.

9. A system for expanding the number of pixels and frames of a television video signal to provide an improved definition image in a progressive scan format, comprising:

means for receiving pixels associated with an incoming frame of a digitized television image having a plurality of horizontal lines;

means for digitally interpolating the pixels along each horizontal line, between horizontal lines and between consecutive frames, including means for over-sampling each horizontal line;

means for interpolating between consecutive lines and between consecutive frames through two-dimensional filtering, the means for interpolating including a finite impulse response filter realized as a systolic array;

means for converting the digitally interpolated image into a progressive raster-scanned format; and means for displaying the converted pixels and frames.

10. A system for expanding the number of pixels and frames of a television video signal to provide an improved definition image in a progressive scan format, comprising:

means for receiving pixels associated with an incoming frame of a digitized television image having a plurality of horizontal lines;

means for digitally interpolating the pixels along each horizontal line between horizontal lines and between consecutive frames, including means for over-sampling each horizontal line, means for interpolating between horizontal lines through one-dimensional, low-pass filtering, and means for increasing the frame rate through frame replication;

means for converting the digitally interpolated image into a progressive, raster-scanned format; and means for displaying the converted pixels and frames.

11. The system of claim 10, wherein the means for interpolating between horizontal lines is a finite impulse response filter realized as a systolic array.

12. The system of claim 10, wherein the 1-D filter is a finite impulse response filter realized as a systolic array.

13. The system of claim 11, wherein the filter comprises processing elements and line delays.

14. A method of expanding the number of pixels and frames of a television video signal to provide an improved definition image in a progressive scan format, comprising the steps of:

receiving pixels associated with an incoming frame of a digitized television image having a plurality of horizontal lines;

digitally interpolating the pixels along each horizontal line, between horizontal lines and consecutive frames by low pass filtering in three dimensions;

converting the digitally interpolated image into an analog, progressive raster scanned format; and displaying the converted pixels and frames at increased frame rate.

15. A method of expanding the number of pixels and frames of a television video signal to provide an improved definition image in a progressive scan format, comprising the steps of:

receiving pixels associated with an incoming frame of a digitized television image having a plurality of horizontal lines;

digitally interpolating the pixels along each horizontal line, between horizontal lines and consecutive frames by over-sampling each horizontal line; and interpolating between horizontal lines through one-dimensional, low-pass filtering; and replicating frames to increase the frame rate;

converting the digitally interpolated image into an analog, progressive raster scanned format; and displaying the converted pixels and frames at increased frame rate.

* * * * *